United States Patent

Tanner

(10) Patent No.: US 7,066,033 B2
(45) Date of Patent: Jun. 27, 2006

(54) MEASURING SENSOR

(75) Inventor: Matthias Tanner, Hemishofen (CH)

(73) Assignee: Hera Rotterdam, B.V., Rotterdam (NL)

( * ) Notice: Subject to any disclaimer, the term of this patent is extended or adjusted under 35 U.S.C. 154(b) by 430 days.

(21) Appl. No.: 10/275,075

(22) PCT Filed: Apr. 26, 2001

(86) PCT No.: PCT/CH01/00266

§ 371 (c)(1),
(2), (4) Date: Oct. 29, 2002

(87) PCT Pub. No.: WO01/84073

PCT Pub. Date: Nov. 8, 2001

(65) Prior Publication Data

US 2003/0110843 A1 Jun. 19, 2003

(30) Foreign Application Priority Data

May 3, 2000 (CH) .............................................. 863/00

(51) Int. Cl.
*G01N 3/02* (2006.01)
*G01N 3/20* (2006.01)
*G01L 1/26* (2006.01)

(52) U.S. Cl. ..................... 73/856; 73/853; 73/862.392
(58) Field of Classification Search ............... 73/856, 73/853, 774, 775, 831, 862.041, 862.043, 73/862.392

See application file for complete search history.

(56) References Cited

U.S. PATENT DOCUMENTS

| 4,084,430 | A | * | 4/1978 | Boyle et al. | ............ 73/862.041 |
| 4,216,403 | A | * | 8/1980 | Krempl et al. | ................. 73/753 |
| 4,246,780 | A | * | 1/1981 | Reed | ....................... 73/862.49 |
| 5,123,283 | A | * | 6/1992 | Duff et al. | ..................... 73/760 |
| 5,284,062 | A | | 2/1994 | Ryffel | |
| 5,327,786 | A | * | 7/1994 | Guillet et al. | ................. 73/779 |

* cited by examiner

*Primary Examiner*—Edward Lefkowitz
*Assistant Examiner*—Lilybett Martir
(74) *Attorney, Agent, or Firm*—Bachman & LaPointe

(57) ABSTRACT

The invention relates to a measuring sensor (1) for measuring positive and negative elongations on cylindrical or profiled bodies (6). The measuring sensor (1) consists of more than two parts and is essentially annular and has at least one tensioning element (7, 15). Two segments (2, 3) that can be tensioned are provided with a recess on the longitudinal center on the internal contour (22), the recess being disposed opposite the direction of tensioning (S) and accommodating a protruding elastic element (8) with a measuring element (10). The recesses can be pressed non-positively onto the surface of the body (6). The segments (2, 3) of the multi-part measuring sensor (1) that are diagonally opposite can be tensioned with their both ends by means of exchangeable and/or adjustable lateral guide members (4, 5, 26, 38) for the body to be measured (6).

12 Claims, 4 Drawing Sheets

MEASURING SENSOR

BACKGROUND OF THE INVENTION

The present invention relates to a transducer for electrical measurement of positive and negative extensions on cylindrical or profiled bodies, the transducer comprising more than two pieces and being essentially annular, with at least one clamping element, where two clampable segments each have, in their longitudinal centre on the inner contour and lying opposite each other in the clamping direction, a recess for a protruding resilient part with a measuring element, which recesses can be pressed by force onto the surface of the body.

Transducers are known which by cylindrical or strip-like resilient bodies generate a contact pressure sufficient to press the extension-sensitive measurement elements by force onto a hole wall. Such transducers are for example known from U.S. Pat. No. 5,284,062 which concerns a cylindrical object of elastomer material, and from CH, A 685575 which concerns the strip-like structure of the resilient part.

Other systems used today by means of belts or magnets clamp measurement bridges with blades at constant spacing onto the surface of flat or cylindrical objects and thus measure the extension occurring. The former transducers have the disadvantage that a hole must be made. The second said solution is very exposed, the measurement bridges can slip and are not therefore suitable for industrial use.

CH, A 687648 also describes a sensor with which the said disadvantages can largely be avoided as resilient elements on the inside of two half-rings press measurement elements onto the outer surface of the body so that the extension occurring there can be measured. These rigid transducers of a particular size are suitable only for a relatively small diameter range. Furthermore the measurement object must be precisely round in cross-section at the measurement point, and this sensor is not provided for angular profiles.

A variant of the sensor to CH, A 687648 has two rods with recesses which are approximately round which correspond at least to the cylinder to be measured. These sensors too are suitable only for a particular diameter range. In a cylinder with a diameter smaller than normal, the device can slip if conditions are unfavourable. This arrangement can also be sensitive to vibrations as generally there are no side guides.

Finally, sensors are known which by means of screws press two flat profiles containing resilient parts with extension-sensitive measurement elements onto a square profile so that the extension can be measured at this profile. This arrangement is, however, only suited for profiles with flat outer surfaces.

SUMMARY OF THE INVENTION

The present invention is based on the task of creating a transducer of the type described initially which is simple to construct and versatile in use, functions economically, and is suitable for robust industrial operation.

The object is achieved according to the invention in that the diagonally opposed segments of the multipiece transducer can be clamped at both ends with interchangeable and/or adjustable side guide elements for the body to be measured. Special and further refined embodiments of the invention are the subject of the dependent claims.

The inner contour of the two segments is formed angular or round depending on the cross-sectional shape and dimensions of the body to be, measured, and in the area of the longitudinal centre of the segments are fitted two resilient elements with measurement elements. When the two segments in conjunction with the guide elements are pressed by suitable clamping means onto the body to be measured, the resilient elements with the measurement elements press on the surface of the body so that the extension occurring there can be measured. The side guide elements firstly serve as a guide so that the transducer does not slip and is not sensitive to vibrations, and secondly the guide elements, if dimensioned accordingly in the clamping direction, can serve as a mechanical stop for protection against excessive clamping forces.

One substantial advantage of the transducer according to the invention is that cheap side guide elements can be interchanged, where in contrast the same costly segments with measurement elements can be used for bodies of different diameter to be measured.

For clamping in particular the following two embodiments are suitable:

the clamping elements are clamping screws which are anchored at both ends in the segments and can act as side guide elements or extend through a hole into special guide pieces, on the one side of the opposing segments—again where guide elements are used—is arranged a hinge and on the other side a quick closure element which can generate the necessary contact force for the force fit.

The two segments containing the measurement elements are preferably formed plane-symmetrical in the clamping direction and at right angles to this. A first standard form is yoke-shaped, of substantially round or angular basic form, with corresponding round or angular inner contours. With regard to the form and size, the segments are approximately but not precisely adapted to the surface of the body to be measured so that as stated a certain play exists for different sizes. The body to be measured, however, lies by force fit only in the area of the measurement elements of the two segments. The two segments to be laid on the body to be measured have at both ends faces spaced apart. The spacing of the faces of the two segments allows side guide elements to be held for the bodies to be measured. The spacing between the faces is suitably approximately 20% of the distance between the two measurement elements, preferably at least 30%.

A further variant of the segments is formed and arranged bar-like, i.e. the segments do not surround the body to be measured but irrespective of its cross-section are formed substantially flat. The side guide elements for the body to be measured must be formed correspondingly flexibly and are usually also interchangeable.

There are several variants for the side guide elements, for example:

Cuboid, parallelipipedic or cylindrical guide pieces have a central bore for a clamping screw introduced therein and anchored in the segments. The guide pieces can be exchanged as required and vary in cross-section. The clamped guide pieces touch the body to be measured preferably along a line (generating line for bodies of round cross-section or edge for n-sided bodies with n=6, 10, 14 à . . . ) or a surface (for n-sided bodies with n=4, 8, 12 à . . . ) but without leading to significant friction losses. All these relatively cheap guide pieces allow a great variance at low cost.

The guide pieces described above can however, instead of being interchanged, also be moved sideways, in particular if they have a plate-like structure where the plate planes run at right angles to the clamping direction. The individual plates, e.g. calibration plates, have central slots and one or two spaced clamping screws pass through these. In this embodiment flexibility is very high as plates can be removed or added and the optimum plate adapted to the object to be measured.

The clamping screws themselves can form the side guide elements if their mutual distance to the body to be measured is adjustable. Part of the outer thread of the clamping screw can also be omitted, in particular around the longitudinal centre stop area for the body to be measured.

In particular, for medium to small diameters of bodies to be measured, the guide pieces in the direction of the body to be measured suitably have projecting parts which can be adapted to the surface form of a particular body, facilitating the transfer of the guide function.

The measurement elements are preferably formed as extension measurement strips or piezo elements which on extension emit electrical signals in the known manner.

Thanks to the solution according to the invention, the risk that the exertion of excessive force or pressure will have a disadvantageous effect can be minimised or fully eliminated as the guide elements are produced and inserted with great precision. When the clamping screws are tightened they form a stop which allows no further force transfer to the measurement elements.

In a further variant the guide elements, in particular the guide pieces, can be fitted on one or both sides in the clamping direction with a resilient layer a few tenths of a millimeter thick. This avoids, when reaching the stop, the necessary force for friction fitting of the measurement element not yet being achieved.

To summarise, it can be found that the transducer according to the invention can thus be mounted quickly and safely even without a hole in the measurement body, the measurement elements are protected and mounted vibration-free. The shape of the segments can be selected so that for each segment pair there is a very wide diameter range whereby the transducers can easily be fitted to bodies with variable profile and different diameters. These advantageous properties are not achieved with any transducer previously known.

Furthermore, according to the invention the possibility is created that extension-sensitive measurement elements such as extension measurement strips can be applied to the surfaces of bodies to be measured without adhesive, where the simple, safe and universal installation leads to new technical possibilities. The extension-sensitive measurement elements, suitably formed as extension measurements strips, are preferably smaller than the resilient part but can also be the same size or larger.

For the detection of longitudinal and transverse extensions, the extension measurement strips are arranged in the axial or radial direction. With suitable connection to a semi- or full bridge, a temperature-compensated extension measurement can also be achieved.

To measure torsion stress on bodies with a cylindrical surface, the extension measurement strips are preferably applied at an angle of 45° to the axis.

BRIEF DESCRIPTION OF THE DRAWINGS

The invention is now explained in more detail with reference to the embodiment examples shown in the drawing, which are also the object of the dependent claims. These show diagrammatically:

DETAILED DESCRIPTION

Figure 1:
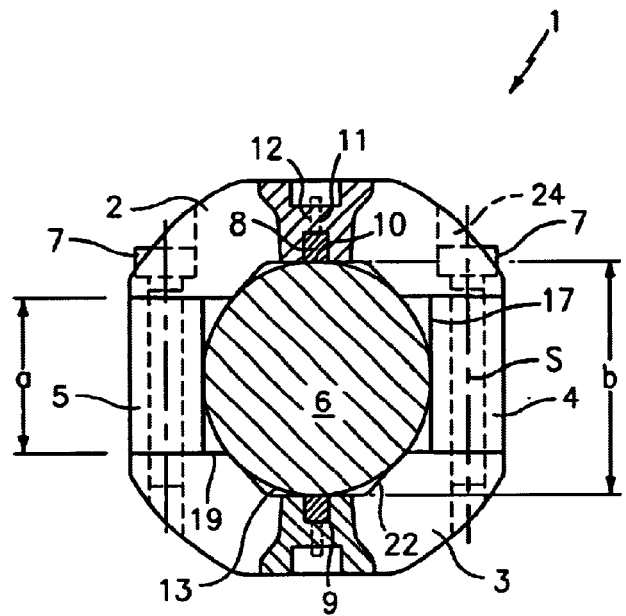
FIG. 1 a partially cut-away front view of a transducer in the fitted state on a cylindrical body of large diameter, FIG. 1a a detail of FIG. 1 in the area of the measurement element, FIG. 2 a variant according to FIG. 1 with a small diameter cylindrical body, FIG. 3 a variant according to FIG. 1 with an octagonal body, FIG. 4 a variant according to FIG. 1 with guide pieces adapted to the body cross-section, FIG. 5 a variant according to FIG. 1 with the clamping screws as guide pieces, FIG. 6 a variant according to FIG. 1 with substantially round segments, FIG. 7 a variant according to FIG. 6 with plate-like guide pieces, and FIG. 8 a top view onto a calibration plate according to FIG. 7.

A transducer 1 shown in FIG. 1 comprising two diagonally opposing segments 2, 3 and two guide elements 4, 5 arranged on the faces between these and in the present case formed as guide pieces, is screwed to a cylindrical body 6. The body 6 to be measured can be solid or tubular but according to a variant also formed as a regular n-sided profile where n is greater than 2 and must be an integer.

The transducer 1 is substantially formed in four parts and is pressed by means of a suitable mechanism—in the present case with clamping screws 7—on the body 6, resilient elements 8 mounted in internal recesses 9 pressing with great force on the surface 13 of the body 6.

The inner contour 22 is octagonal. According to variants the inner contour 22 can also be round or generally n-sided, where suitably n=4, 6, 8, 10 . . . , so that in each case two parallel opposing surfaces are formed. The octagonal embodiment shown in FIG. 1 is preferred in practice.

The guide pieces 4, 5 serve for centering and mechanical stabilisation for changing diameters of body 6. For the sake of simplicity the distance between two opposing surfaces of an n-sided body is here and elsewhere referred to as the diameter.

The inner contour 17 of the guide pieces 4, 5 can according to FIG. 1 be flat but also adapted as part of a polygon or other shape of the body to be measured. For the measurement of bodies 6 of circular or regular polygonal cross-section, the guide pieces 4, 5 are dimensioned so that the spacing of their inner contours 17 corresponds to the distance b between the two segments 2, 3 in the measurement area. It is important that the guide pieces 4, 5 each lie on the body 6 to be measured at least at one point or along a line and can thus exercise a stabilising and centering function.

It is also important that the resilient part 8, with a measurement element 10 lying on the open side, protrudes slightly beyond the inner contour 22 of the segment 2, 3 concerned and can thus be pressed on without problem. The faces 19 of the two segments 2, 3 in the end area have a spacing a when they lie on the body 6 in the area of the measurement elements 10. The guide pieces 4, 5 have a precisely predetermined dimension corresponding to a. Thus protection is achieved against excessive force application.

The pressure on the extension-sensitive measurement element 10 must be so great that a force connection is created between this measurement element 10 and the body surface 13. Thus, forces acting on the body 6 and causing the extension are measured by means of the extension-sensitive measurement elements 10. The measurement elements 10 are protected against mechanical damage and mounted to be vibration-resistant.

Figure 2:
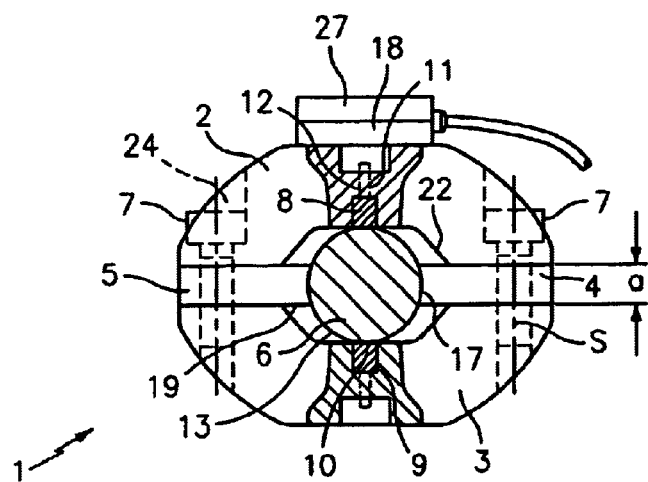

Signal cables 11 are guided through the resilient part 8 and through a bore 12 to analysis electronics 18 (FIG. 2). The signal cables 11 can also be guided out axially in a corresponding manner.

Figure 1A:
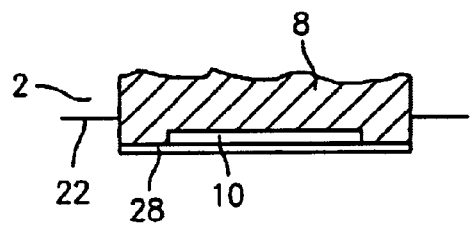

FIG. 1a shows an additional mechanical protection of an extension-sensitive measurement element 10 by means of a film 28 which is laid over the resilient element 10 and the extension-sensitive measurement element 10 and attached by suitable means to the resilient part 8, or in a variant not shown is dimensioned larger and attached to the inner contour 22 of the segment 2, 3 concerned.

FIG. 2 shows a transducer 1 with integral analysis electronics 18. The transducer 1 is clamped to a cylindrical body 6 of smaller diameter than in FIG. 1 where the inner contour 17 of the interchangeable guide pieces 4, 5 is adapted to the surface 13 of the cylindrical body 6. In comparison with FIG. 1 it can be seen that by simple exchange of guide pieces 4, 5, which can be produced at low cost, the same segments 2, 3 with a costly measurement element 10 can be used for different diameters. Guide pieces 4, 5 usually have the same dimensions, ensuring that the measurement elements 10 are clamped diagonally opposite each other. Thus by addition of the two measurement signals, the flexion can be compensated. If, however, the two measurement signals are subtracted, the flexion results as the remaining component.

The measurement signal can be directed away, amplified by analysis electronics 18 which are kept very small, and already integrated in segment 2 or 3 or transmitted by telemetry by other analysis electronics 18 connected with the transmitter device 27. The latter variant is particularly interesting with moving or rotating bodies.

Figure 3:
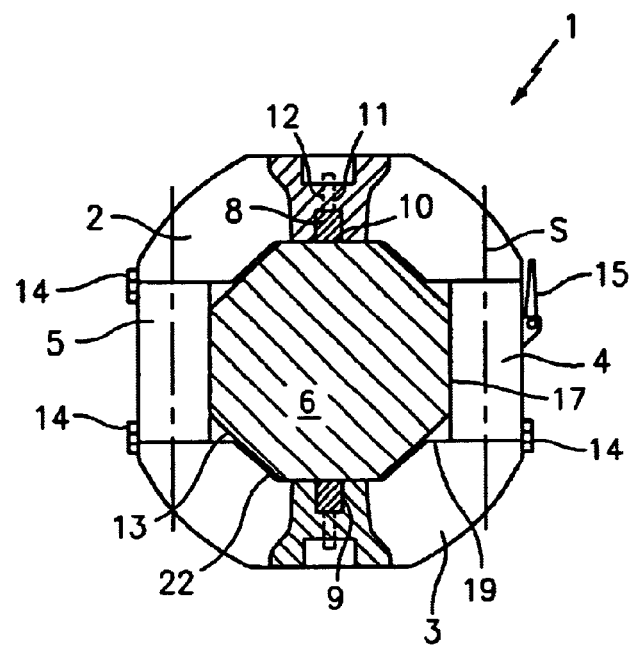

FIG. 3 shows a transducer 1 in which hinges 14 and a quick closure 15 are used as clamping means. The hinges 14 are formed so that the guide pieces 4, 5 are interchangeable, therefore with this variant extensions on bodies 6 of different diameters or—as in the present case—octagonal bodies 6, can be measured. The body 6 to be measured can—as in the embodiments of the other figures—lie in the clamping direction S only on the inner contour 22 of segments 2, 3.

Figure 4:
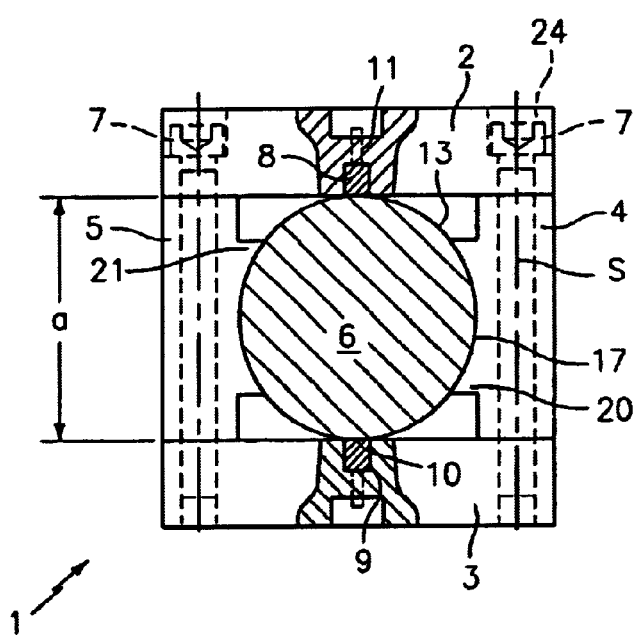

FIG. 4 shows a further transducer 1 with flat segments 2, 3 formed as bars. The guides elements 4, 5 in the direction of body 6 have protruding parts 20, 21 and are formed so that they touch the cylindrical body 6 or are adapted to its surface 13. This ensures that the extension-sensitive measurement elements 10 come to lie on body 6 only diagonally opposite. FIG. 4 also shows that the height a of the guide pieces 4, 5 is dimensioned so that on tightening of the clamping screws 7 the bar-like segments 2, 3 rest on the guide pieces 4, 5 when the necessary contact force is achieved. Thus the permitted contact force is not exceeded even without a torque limitation on the clamping screws 7. Thus for corresponding height a of the guide pieces 4,5 the use of a torque limiting screw driver can be omitted without risk. This variant is particularly economical to produce as the bar-like segments 2,3 are ideally available as flat profiles.

Figure 5:
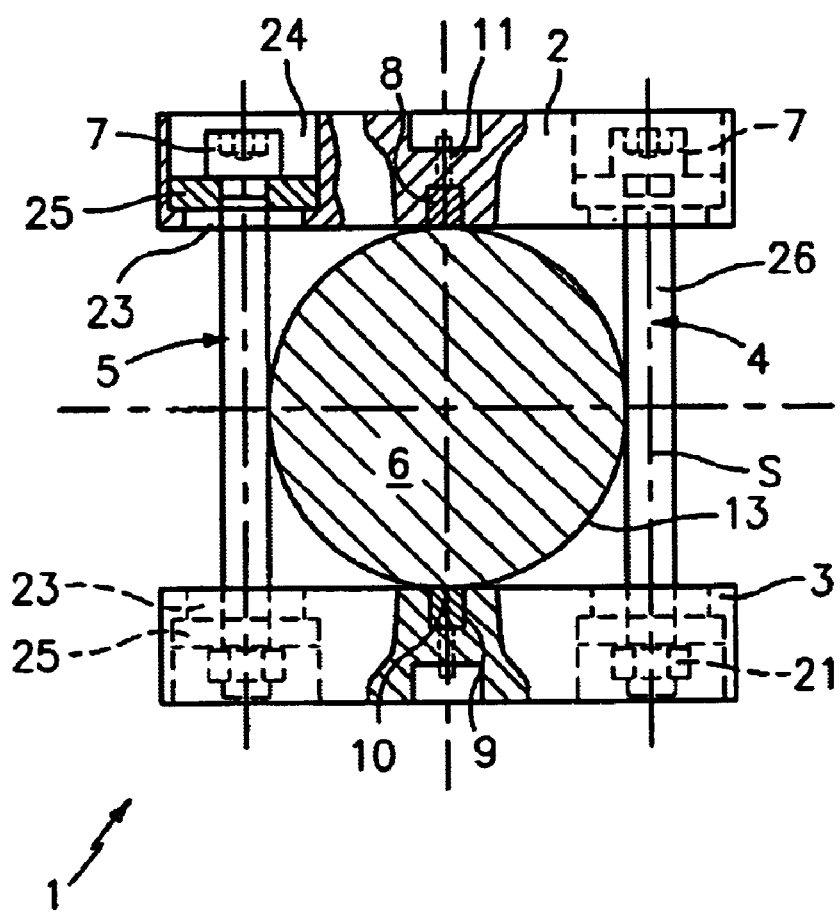

FIG. 5 shows a transducer 1 in which the guide elements 4, 5 are formed as displaceable clamping screws 7. These clamping screws 7 with counter-nuts 21 sit in slots 23 running at right angles to the clamping direction S and arranged accordingly in the bar-like segments 2, 3, and by displacement the said screws can be adapted to the variable diameter of the body to be measured, the lateral guidance being guaranteed by the screw shaft 26 itself. For simpler determination of the position of the clamping screw 7, a precisely fitting plate 25 with at least one bore or slot 30 (FIG. 8)—can be inserted in an enlarged recess 24 for the screw head. The position of the bore(s) or the clamping screw(s) here is dependent on the diameter of the body 6 to be measured. This achieves that the clamping screws 7 come to lie so close to the body 6 to be measured that they guide the transducer 1 laterally in the same manner as the guide pieces described above. It is also ensured that the measurement elements 10 are clamped diagonally onto the body 6 to be measured.

Figure 6:
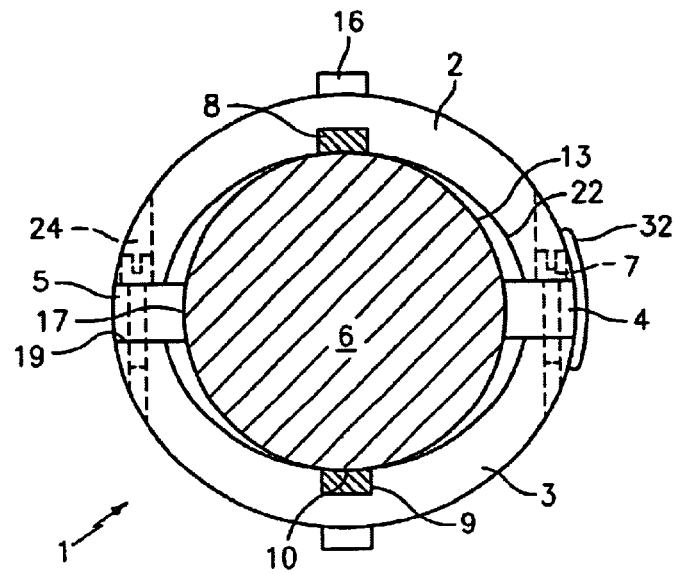

The embodiment according to FIG. 6 has two segments 2, 3 which are arranged to be substantially round. Their inner contour 22 has a larger radius than the body 6, the axes of segments 2, 3 are also offset in relation to those of the cylindrical body 6. Starting from the resilient part 8 with measurement element 10, as the distance increases a gap opens between the inner contour 22 and the surface 13 of the body 6.

The body 6 is fixed by the guide pieces 4, 5 which are pushed on its surface which in turn are each held by a clamping screw 7.

In the area of one guide piece 4, a resilient rubber plate 32 is drawn over the guide piece and attached, for example screwed, on both sides to segment 2, 3. This gives the entire transducer a resilient "hinge" which holds the two segments together without hindering the clamping movements in the least.

Furthermore, in the area of measurement element 10 a jack socket 16 is attached which is partially recessed, partially protruding on the outside of segments 2 and 3, and fitted with a protective cover.

Figure 7:
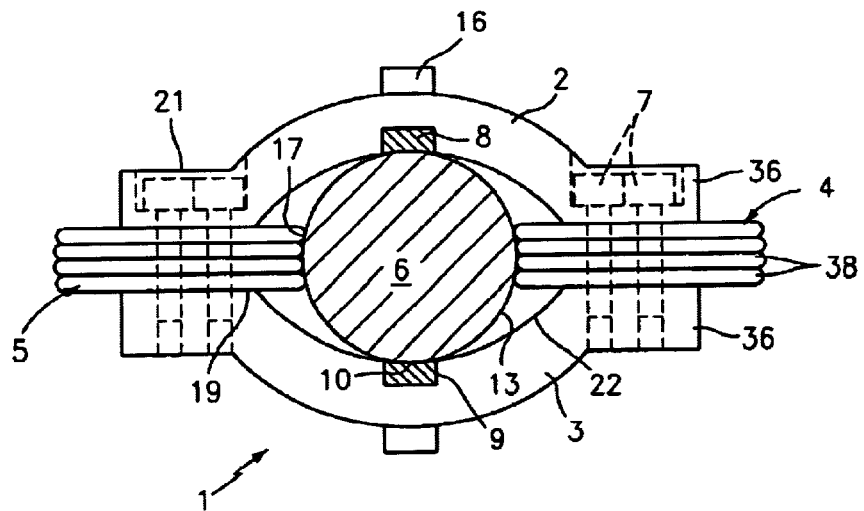

In the embodiment in FIG. 7 the two segments 2, 3 have end parallel flanges 36 which are connected by two clamping screws 7. The two guide elements 4, 5 are formed from calibration plates 38 lying on each other with a slot 30. Calibration plates of the same or different thickness allow great flexibility from a small stock. The calibration plates 38 can be placed individually on body 6 with the clamping screws inserted in the slots 30 and thus form an optimum guide, in particular on rounding of the corresponding narrow sides. All or some of the calibration plates can be used, at least a pair in the centre area.

For a larger diameter than shown in FIG. 7 the number of calibration plates is increased accordingly and they are positioned on the body as shown.

Figure 8:
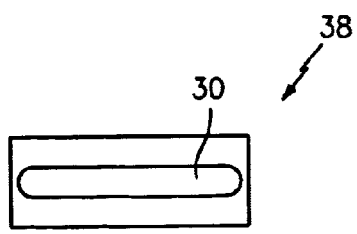

The calibration plate shown in FIG. 8 has a slot 30 which allows full adjustment movement in the longitudinal direction.

What is claimed is:

1. Transducer (1) for electrical measurement of positive and negative extensions on cylindrical or profiled bodies (6), the transducer comprising more than two pieces and being substantially annular, with at least one clamping element (7, 15), where two clampable segments (2, 3) each have, in their longitudinal centre on the inner contour (22) and lying opposite each other in the clamping direction (S), a recess for a protruding resilient part (8) with a measurement element (10) which is pressed by force onto the surface of the body (6), characterized in that diagonally opposed clampable segments (2, 3) of the transducer (1) are clamped at both ends with at least one of interchangeable and adjustable side guide elements (4, 5, 26, 38) for the body (6) to be measured, wherein the segments (2, 3) are formed in yoke form, round or with multiple edges, which approximate to the form and size of the surface (13) of the body (6) but lie on this body (6) only in the area of the measurement element (10), where the faces (19) of the segments (2, 3) have a spacing (a) of at least 30% of the spacing (b) of the measurement elements (10).

2. Transducer (1) according to claim 1, characterized in that the guide elements (4, 5) are formed as clamping screws (7) anchored at both ends in the segments (2, 3).

3. Transducer (1) according to claim 1, characterised in that the clampable segments (2, 3) are formed bar-like.

4. Transducer according to claim 1 characterised in that the guide elements (4, 5) are formed as cuboid, parallelipipedic or cylindrical guide pieces with a central bore for a clamping screw (7) connecting the segments (2, 3), where the guide elements (4, 5) touch the body (6) along a line or surface and guide it without significant friction losses.

5. Transducer (1) according to claim 4, characterised in that the guide elements (4, 5) have parts projecting in the direction of the body (6) which assume a guidance function.

6. Transducer according to claim 1, characterised in that the guide elements (4, 5) have a slot (3) for clamping screws (7), are divided plate-like perpendicular to the clamping direction (S) and can be fixed by tightening at least one clamping screw (7) per slot (30).

7. Transducer (1) according to claim 1, characterised in that the guide elements (4, 5) are clamping screws (7) and wherein mutual distance of the clamping screws to the body (6) is adjustable.

8. Transducer (1) according to claim 1, characterised in that the measurement element (10) is an extension measurement strip or piezo element.

9. Transducer according to claim 1, characterised in that the clampable segments are metallic segments (2, 3) and the guide elements (4, 5) with the clamping element (7) form a stop for stress limitation.

10. Transducer (1) according to claim 1, characterized in that the guide elements (4, 5) are formed as a hinged quick closure (14, 15) established on the segments (2, 3).

11. Transducer (1) according to claim 1, characterized in that the clampable segments (2, 3) are substantially rigid members.

12. Transducer (1) for electrical measurement of positive and negative extensions on cylindrical or profiled bodies (6), comprising:

at least two substantially annular segments (2, 3) each having an inner contour and a longitudinal center on the inner contour (22), and each further having a recess positioned along the longitudinal center and opposite each other in a clamping direction (S);

a protruding resilient part (8) in the recess, the resilient part having a measurement element (10) which is pressed by force onto the surface of a body (6) to be measured; and at least one of interchangeable and adjustable side guide elements (4, 5, 26, 38) corresponding to the body (6) to be measured, the guide elements being positioned between the annular segments to adapt the annular segments to use in measuring bodies (6) of different size, wherein the segments (2, 3) are formed in yoke form, round or with multiple edges, which approximate to the form and size of the surface (13) of the body (6) but lie on this body (6) only in the area of the measurement element (10), where the faces (19) of the segments (2, 3) have a spacing (a) of at least 30% of the spacing (b) of the measurement elements (10).

* * * * *